J. McKibben,
Bridle.
No. 3,448. Reissued May 18. 1869.
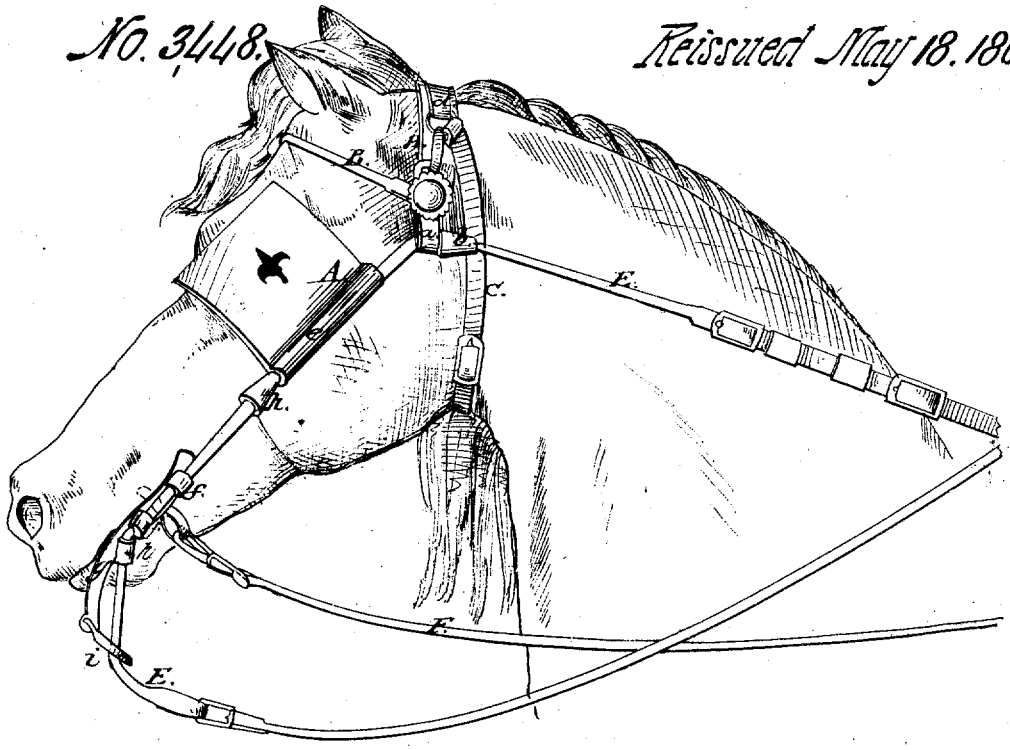
Witnesses:
Wm A. Morgan
Geo. Colton.
Inventor:
John McKibben
per Munn & Co.
attorneys.
N. PETERS, PHOTO-LITHOGRAPHER, WASHINGTON, D. C.

United States Patent Office.

JOHN McKIBBEN, OF LIMA, OHIO.

*Letters Patent No.* 84,838, *dated December* 8, 1868; *antedated December* 1, 1868; *reissue No.* 3,448, *dated May* 18, 1869.

IMPROVED BRIDLE.

The Schedule referred to in these Letters Patent and making part of the same.

*To all whom it may concern:*

Be it known that I, JOHN McKIBBEN, of Lima, in the county of Allen, and State of Ohio, have invented a new and improved Bridle; and I do hereby declare that the following is a full, clear, and exact description thereof, which will enable others skilled in the art to make and use the same, reference being had to the accompanying drawings, forming part of this specification.

This invention relates to a new and improved bridle, as hereinafter fully shown and described, whereby several advantages are obtained, which will be presently set forth.

The accompanying drawings represent a side view of my invention, applied to a horse.

A represents the blinders;
B, the brow-strap;
C, the throat-latch;
D, the head-strap;
E, the rein; and
F, the driving-rein.

The brow-strap B and reins E connect by loops *a* to the head-strap D, or with snap-hooks *b*, made short, for convenience in the use of inverted or reversed springs, fitted to the rings *c*, on the sides of the head-straps D, as clearly shown in the drawing.

At the rear edges of the blinders A are tubes, or loops *e*, of metal or leather, for reins E to pass through, as also are guides, or rings *f f*, on the upper part of the side bars *g* of the bit, and rings, or guides *i*, at the lower end of bar *g*.

By the use of these rings *i*, a lever-power is added to the curb, the rings *f f* acting as pulleys.

The lines, or driving-reins F, are attached directly to the check-reins E, below these rings, as shown in the drawing, giving a direct action on the check-rein E, and a reaction from the water-hook, or, in fact, from the crupper, equal to that employed by the driver doubling that force on the bit, and easily bringing the horse under complete control.

The lower rings, or guides *i* may be dispensed with, when desired, by withdrawing the check-reins E therefrom, and having the said reins to pass through the rings, or guides *j*, at the upper and back part of the bar *g*. In this case the action will be that of a common bar-bit.

The rein E is supplied with stops *h h h* below guides *f f*, of the bars *g* of the bit, and below the blinders A, and above the loop, or swivel *a*, at the sides of the head-stall, which limit the movement and action of the reins E, and prevent any unnecessary play of the same.

Having thus described my invention,

I claim as new, and desire to secure by Letters Patent—

1. The rein E, provided with stops *h h h*, in combination with guides *f f*, rings *i* and *j* on the bit, and the tubes *e*, at the rear edges of the blinders, and through which the reins pass, all arranged substantially as and for the purposes set forth.

2. The reins E, suspended by loops, or swivels *a*, short snap-hooks *b*, and rings *c*, from the head-strap D, all substantially as specified.

JOHN McKIBBEN.

Witnesses:
CHRISTIAN PARTSCHER,
G. W. OVERMYER.